UNITED STATES PATENT OFFICE.

JOHN EDMUND HINDON HYDE, OF NEW YORK, N. Y.; WILLIAM H. HYDE AND ELLEN E. H. HYDE EXECUTORS.

WATERPROOFED LINE USED FOR FISHING.

1,165,179. Specification of Letters Patent. Patented Dec. 21, 1915.

No Drawing. Application filed February 9, 1912. Serial No. 676,676.

*To all whom it may concern:*

Be it known that I, JOHN EDMUND HINDON HYDE, a citizen of the United States, residing in the city of New York, county of Queens, and State of New York, and whose post-office address is No. 64 Wall street, borough of Manhattan, city of New York, have invented a new and useful Improvement in Waterproofed Lines Used for Fishing, of which the following is a specification.

My invention relates to the production of a new article of manufacture which consists of a flexible waterproofed line suitable for use either as a hand-line or coiled upon a reel, or when used in the manufacture of fishing nets.

It is known to those skilled in the art that a waterproofed fishing-line which can be used both in fresh water and in salt water without losing its waterproofed property, and in which either silk, flax or cotton can be used as the fibrous portion of the line, as desired, without having such fibrous portion rotted by the coating, is desirable; and though this object was obtained in the invention described in Letters Patent of the United States dated May 14th, 1901, Number 673,955, granted to me, there was still the disadvantage of using an inflammable base which the present invention is designed to overcome. Flexible waterproofed silk lines for fishing in fresh water have long been made and are useful when new; but the coating of such lines, as is well known, is apt to become sticky after a time, and the line also looses its ordinary strength, while such lines (except those made according to my inventions) are not efficient for use in salt water because the best waterproofed preparation commonly used, the basis of which is linseed-oil, will not resist the chemical action of the haloid salts contained in salt water. Again, the linseed-oil preparations used for waterproofing fishing-lines used in fresh water cannot be used as a coating for fishing-line made of flax or of cotton, because they rot the flax and the cotton within a very short period. Practically, therefore, waterproofed fishing-lines heretofore made before my inventions have consisted of silk coated with linseed-oil preparations, and while these are necessarily expensive, they have a limited use, as above explained. Preparations of tar have sometimes been used to waterproof nets used in salt water fishing, but such coating besides impairing the strength of the fiber of the line, is not flexible enough under ordinary conditions of temperature, and it becomes sticky in warm weather and brittle in cold weather and is totally unsuitable for waterproofing fishing-lines used as such.

The object of my present invention has been to produce a waterproofed fishing-line in which the fibrous portion may consist of silk, flax, or cotton, as desired, with a flexible covering which is non-inflammable and which is sufficiently hard, is elastic, is smooth, does not impair the strength of the fiber used, resists disintegration by the air, salt water, and fresh water, clings tenaciously to the line and preserves all of these qualities both in hot and cold weather. I have discovered that a waterproofed line having all these characteristics may be made by coating the fibrous portion of the line with a thin solution of acetyl (acetylated) cellulose which, upon evaporation of the volatile solvents, leaves as a residue a fibrous line coated with a composition of matter consisting of dissolved acetyl cellulose, a non-drying, non-volatile oil which is soluble in alcohol but not in water, and an antiacid substance which neutralizes acids and is practically insoluble in water. I have found that a suitable solution for this coating is composed of acetyl cellulose, 100 parts by weight; castor-oil, 250 parts by weight; amyl acetate, 400 parts by weight; magnesium carbonate, (or urea) 2 parts by weight; and a mixture of dichlorhydrin and methyl alcohol, 600 parts by weight. The amount of the solvent (dichlorhydrin and methyl alcohol) can be increased or decreased according to the consistency desired in the coating solution, although I recommend that a thin solution be used and the thickness of the coating increased as desired by repeated applications of the solution. The function of these constituents is as follows:—The dissolved acetyl cellulose gives consistency to the coating and is non-inflammable. The castor-oil gives the requisite flexibility and also toughens the fibers which are used in the line. The mixture of dichlorhydrin and methyl alcohol acts as the solvent and the amyl acetate causes a sufficiently slow evaporation of the solvent to produce a practically non-porous homogeneous residuum. The magnesium carbonate is practically insoluble in water, and the urea, while soluble in water, is so retained by the other ingredients that it also is practically insoluble in water. These anti-acid substances neutralize any free acid that may be developed in the coating composition and would otherwise impair the strength of the fibrous portion of the line, and also tend to restrain the development of the glycerin of ricinoleic acid contained in the castor-oil into the solid modification, ricinelaidic acid, and thus injure the flexibility of the line. I do not, however, confine myself to the use of a coating solution which contains these specific solvents and neutralizing agents nor to the specific proportions mentioned, because any equivalent substances may be used with the acetyl cellulose which have the same properties and functions and the proportions may be varied without departing from my invention. Other solvents such as acetone, carbon tetrachlorid, chloroform, etc., may be used, but I prefer the solvent mixture described. So, also, there are certain waxy substances and there are oils, such as fish-oils, cotton-seed oil, and corn oil, which are just on the border between drying and non-drying, in that while they never harden by oxidation so as to prevent flexibility, they do become thicker in consistency after exposure to the air. Such substances as these which are really non-drying and have the functions stated as a requisite are equivalents in my invention for the castor-oil, and are included under the term "non-drying oil". Linseed-oil is a type of drying-oil which is not suitable for my invention, and castor-oil is a type of oil which is suitable for my invention. So, also, there are other anti-acid substances which are practically insoluble in water, such as calcium carbonate and calcium lactate, which may be used instead of the magnesium carbonate; but while I prefer the use of anti-acid substances which are practically insoluble in water, I do not limit myself to the use of the insoluble anti-acids, since good results may be achieved by the use of soluble anti-acids, because even if soluble in water, as urea, they are largely prevented from coming into contact with the water by the other ingredients present in the compound. I also recommend fusel-oil as a useful ingredient in my coating and it should be used in proportions of from 20 to 60 parts by weight. Fusel-oil is more especially a diluent than a solvent, but has properties which are useful in the coating solution.

The coating solution may be applied to the fibrous portion of the line in any suitable manner; but I have found that an efficient method is to pass the twisted or braided fiber through the solution at ordinary temperatures, scraping off the excess of solution and winding the coated line on reels when it is sufficiently dried by evaporation of the volatile elements of the solution to permit of such winding.

Acetyl cellulose solutions have great adhesive affinity for cellulose fibers generally. They seem to be absorbed by such fibers and to soak into them more readily than say nitro-cellulose solutions. Why this should be the case, has not yet been fully determined though it possibly depends upon the affinity of celluloses for water—the water of hydratio present in all fibers of this character. This quality insures a flexible ultimate coating which extends into and unless the thickness of the line is considerable—through the body of the line or coat.

In the case of nets, the line may be first coated with the waterproofed solution and subsequently manufactured into nets, or the unwaterproofed net may be dipped into the waterproofed solution and subsequently exposed to the air for evaporation of the volatile substances of the coating.

Having described my invention, what I claim is:—

1. A fishing-line, either for use as a line or for use in the form of nets, soaked and waterproofed by a specially adhesive composition of matter consisting of dissolved acetyl cellulose, a non-drying fatty substance soluble in a solvent of acetyl cellulose but not in water, and an anti-acid substance, substantially as described.

2. A fishing-line, either for use as a line or for use in the form of nets, soaked and waterproofed by a specially adhesive composition of matter consisting of dissolved acetyl cellulose, a non-drying, non-volatile oil soluble in alcohol but not in water, and an anti-acid substance which neutralizes acids and which is practically insoluble in water, substantially as described.

3. A fishing-line, either for use as a line or for use in the form of nets, soaked and waterproofed by a specially adhesive composition of matter consisting of dissolved acetyl cellulose, a solvent of such cellulose, a non-drying non-volatile oil soluble in alcohol but not in water, and an anti-acid substance which neutralizes acids and which is practically insoluble in water, substantially as described.

4. A fishing-line, either for use as a line or for use in the form of nets, soaked and waterproofed by a specially adhesive composition of matter consisting of dissolved acetyl cellulose, a solvent consisting of a mixture of dichlorhydrin and methyl alcohol, a non-drying fatty substance soluble in such solvent but not in water, and an anti-acid substance, substantially as described.

5. A fishing-line, either for use as a line or for use in the form of nets, soaked and waterproofed by a specially adhesive composition of matter consisting of dissolved acetyl cellulose, a solvent consisting of dichlorhydrin and methyl alcohol, a non-drying fatty substance soluble in such solvent but not in water, amyl acetate, and an anti-acid substance, substantially as described.

6. A fishing-line, either for use as a line or for use in the form of nets, soaked and waterproofed by a specially adhesive composition of matter consisting of dissolved acetyl cellulose, a solvent consisting of dichlorhydrin and methyl alcohol, a non-drying fatty substance soluble in such solvent but not in water, amyl acetate, fusel-oil, and an anti-acid substance, substantially as described.

7. A fishing-line, either for use as a line or for use in the form of nets, soaked and waterproofed by a specially adhesive composition of matter consisting of dissolved acetyl cellulose, a solvent consisting of dichlorhydrin and methyl alcohol, a non-drying fatty substance, soluble in such solvent but not in water, amyl acetate, fusel-oil, and urea, substantially as described.

8. A fishing-line, either for use as a line or for use in the form of nets, soaked and waterproofed by a specially adhesive composition of matter consisting of dissolved acetyl cellulose, a solvent thereof, castor-oil, amyl acetate, urea and fusel-oil, substantially as described.

9. A fishing-line, either for use as a line or for use in the form of nets, soaked and waterproofed by a specially adhesive composition of matter consisting of dissolved acetyl cellulose, a solvent consisting of dichlorhydrin and methyl alcohol, castor-oil, amyl acetate, urea, and fusel-oil, substantially as described.

JOHN EDMUND HINDON HYDE.

Witnesses:
MABEL DENTON,
GEO. C. HOWARD.